United States Patent [19]

Diessner

[11] Patent Number: 4,736,828

[45] Date of Patent: Apr. 12, 1988

[54] CLUTCH DISCS FOR A FLUID FRICTION CLUTCH AND PROCESS FOR MAKING SAME

[75] Inventor: Eberhard Diessner, Wolfsburg, Fed. Rep. of Germany

[73] Assignee: Volkswagen AG, Wolfsburg, Fed. Rep. of Germany

[21] Appl. No.: 24,623

[22] Filed: Mar. 11, 1987

Related U.S. Application Data

[62] Division of Ser. No. 850,958, Apr. 11, 1986.

[30] Foreign Application Priority Data

Apr. 12, 1985 [DE] Fed. Rep. of Germany ....... 3513078

[51] Int. Cl.$^4$ .............................................. F16D 35/00
[52] U.S. Cl. ................................. 192/58 B; 192/70.14
[58] Field of Search ................ 192/58 A, 58 B, 58 C, 192/70.14; 74/711

[56] References Cited

U.S. PATENT DOCUMENTS

| | | | |
|---|---|---|---|
| 3,896,684 | 7/1975 | Duer | 74/711 |
| 4,031,780 | 6/1977 | Dolan et al. | 74/711 |
| 4,040,271 | 8/1977 | Rolt et al. | 192/58 B |
| 4,048,872 | 9/1977 | Webb | 74/711 |
| 4,058,027 | 11/1977 | Webb | 74/711 |
| 4,096,712 | 6/1978 | Webb | 192/58 B X |
| 4,432,444 | 2/1984 | Hauser | 192/58 B |
| 4,516,443 | 5/1985 | Homano et al. | 74/711 |
| 4,667,534 | 5/1987 | Kataoko | 74/711 |

OTHER PUBLICATIONS

ISO Standard Sheet 4287/1, (Dec. 15, 1984), pp. 14–16.

Primary Examiner—Rodney H. Bonck
Assistant Examiner—Richard M. Lorence
Attorney, Agent, or Firm—Brumbaugh, Graves, Donohue & Raymond

[57] ABSTRACT

Lamellar clutch discs consisting of sheet steel and arranged in an enclosed housing filled with a viscous liquid medium for a fluid friction clutch are described. To achieve a torque transmission behavior of the clutch that will remain constant over long periods of time, the surfaces of the discs are to exhibit a roughness with an arithmetic mean rugosity $R_a$ in the range between 0.2 and 2 microns and a profile depth $P_t$ in the range between 2 and 15 microns. Furthermore, the distance between neighboring elevations of the rugosity profile is to lie in the range between 50 and 750 microns, and the surfaces are to have a wear-reducing nickel-phosphorus coating.

3 Claims, 2 Drawing Sheets

CLUTCH DISCS FOR A FLUID FRICTION CLUTCH AND PROCESS FOR MAKING SAME

This application is a division of application Ser. No. 850,958, filed on Apr. 11, 1986.

BACKGROUND OF THE INVENTION

The invention relates to lamellar clutch discs consisting of sheet steel and arranged in an enclosed housing filled with a viscous liquid medium for a fluid friction clutch.

Fluid friction clutches equipped with lamellar discs are known for example from German Patent No. 2,135,791. These fluid friction clutches are distinguished primarily by the fact that they can transmit a torque upon occurrence of a relative rotational speed between the drive and the driven side of the clutch. The cause of this automatically adjusting torque transmission is to be found in the liquid medium, which owing to its viscosity builds up shearing stresses that oppose the relative rotation of the clutch discs as they are connected to the drive and the driven side alternately. The magnitude of these shearing stresses and hence the amount of the transmissible torque depends, among other things, on the viscosity level of the liquid medium, the temperature, the pressure, the lamella spacing, and the fill of the housing. Advantageously, such fluid friction clutches may be arranged as differentials in the power transmission of a motor vehicle, for example between two wheels of an axle or, in particular, between two axles of a vehicle that are capable of being driven by a common motor.

The use of such fluid friction clutches, however, according to the prevailing operating conditions, calls for a very precise adjustment of the gradient of the torque transmitted by the clutch and a corresponding adaptation of the speeds of the drive and driven sides as functions of time. Thus it has been found that even minor differences in fill of the clutch housing lead to a change in torque performance, and that the characteristic of the clutch in particular is markedly affected by wear.

SUMMARY OF THE INVENTION

On the premise of the inventors' discovery that the torque transmission behavior of a fluid friction clutch of the kind previously mentioned is markedly dependent on the microscopic surface texture of the clutch discs, the object of the invention is to be seen as that of proposing clutch discs for fluid friction clutches that will attain as constant a torque behavior as possible, under otherwise like conditions, over practically the entire service life of the clutch.

Pursuant to this object, as well as others which will become apparent hereafter, one aspect of the present invention resides in the clutch discs having a roughness with an arithmetic mean rugosity $R_a$ in the range between 0.2 and 2.0 microns and a profile depth $P_t$ in the range between 2.0 and 15 microns. Further, the clutch discs exhibit a surface texture with a comparatively high degree of smoothing in the form of an elevated bearing portion and a residual rugosity of sufficiently uniform distribution, preferably in combination with effective wear protection in the form of a nickel-phosphorus coating.

Such clutches are produced by a process wherein steel sheet stock is first subject to coarse finishing and after the clutch discs are punched out fine finishing is carried out to even the surface texture.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
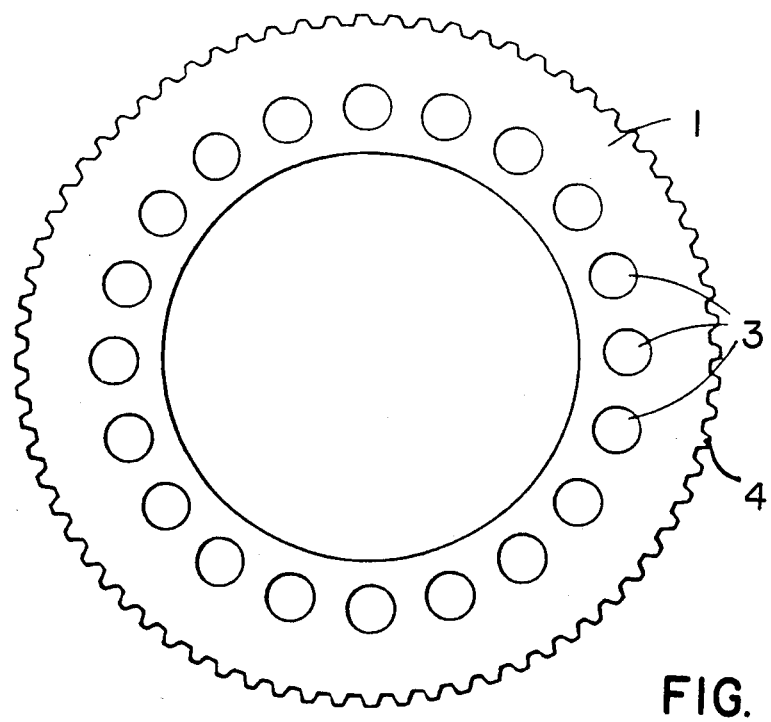
FIGS. 1 and 2 show views of two discs of a fluid friction clutch.
Figure 2:
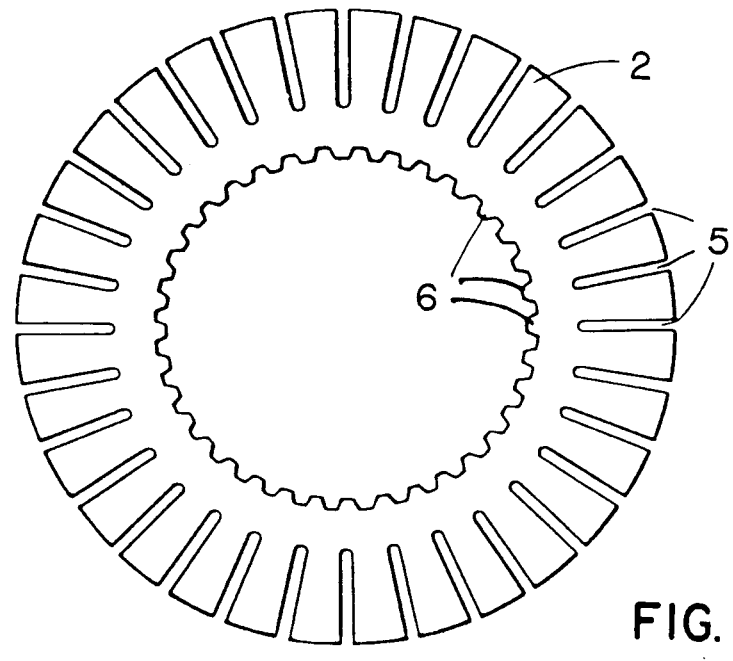

FIGS. 1 and 2 of the drawing each show an embodiment, by way of example, of the lamellar discs of a fluid friction clutch, each to be arranged axially adjacent and closely spaced in a housing closed off from the outside and filled with a high-viscosity liquid medium. The ring-shaped clutch disc 1 shown in FIG. 1 exhibits gear teeth 4 on its outer periphery which mesh with matching internal gear teeth in the clutch housing (not shown). The clutch disc 1 moreover exhibits a plurality of through holes 3 distributed more or less evenly over the circumference of a circle arranged concentrically with the axis of the disc.

The clutch disc 2 shown in FIG. 2, contrariwise, exhibits gear teeth 6 on its inner periphery which mesh with matching external gear teeth on a central drive shaft (not shown). On the outer periphery of the clutch disc 2, furthermore, radially extending slits 5 are provided, which are likewise evenly distributed over the circumference. The thickness of these lamellar clutch discs 1 and 2 may be between about 0.4 and 1.5 mm.

Figure 3:
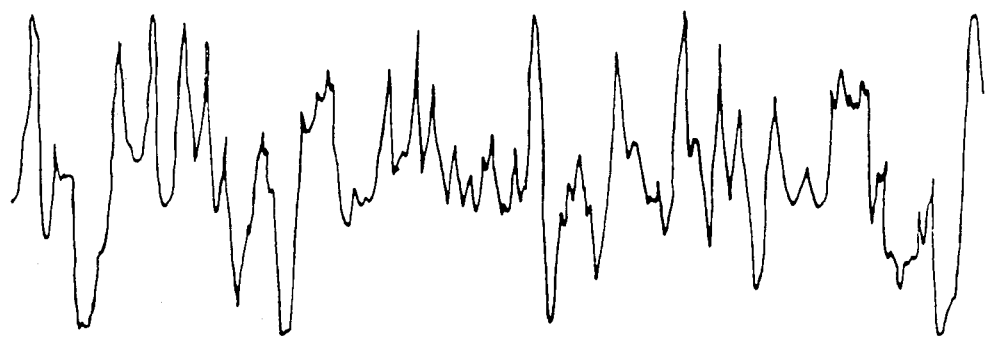
FIG. 3 shows a recorded graph of the surface texture of the coarse-finished steel sheet to be used for the clutch disc.

The production of these clutch discs is carried out by first subjecting the steel sheet used as stock to a coarse finishing operation by cold rolling or by smooth rolling with subsequent wheel brushing, or alternatively by etching or pickling, thus establishing a surface contour as illustrated for example in FIG. 3 for rolled sheet stock. The surface is then to exhibit rugosities $R_z$ according to DIN 47 68 (August 1974) in a range from 5 to 25 microns and an arithmetic mean rugosity $R_a$ according to DIN 47 68 Supplementary Sheet 1 (October 1978) in the range of 0.5 to 2.5 microns.

Figure 4:
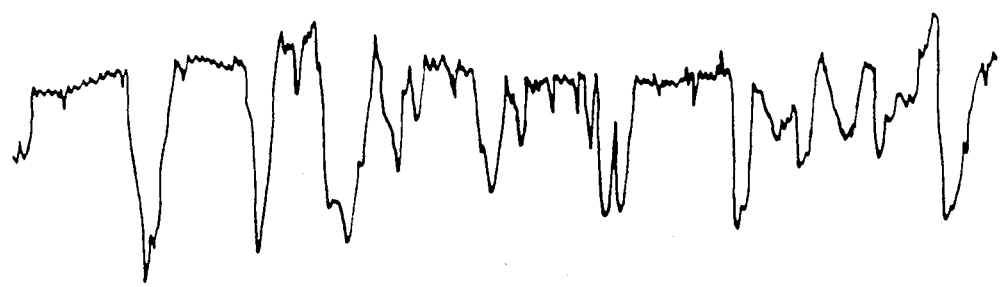
FIG. 4 shows a recorded graph of the surface texture of the clutch disc after fine finishing.

From a steel sheet thus coarsely finished, the clutch discs are now obtained by punching them out, for example in a shape as shown in FIGS. 1 and 2. These clutch discs are then subjected to fine finishing to even the surface texture and at the same time remove burrs, for example by belt or slide grinding, with or without a subsequent roll straightening or straightening roll operation, or alternatively a smooth rerolling operation. The surface is then to exhibit an arithmetic mean rugosity $R_a$ in the range from 0.2 to 2 microns with a residual profile depth $P_t$ according to DIN 47 71 (April 1977) in the range of 2.0 to 15 microns. An example of this surface texture is shown in FIG. 4 for a clutch disc surface that has for example been belt ground. As a further criterion of the surface texture, the distance between neighboring profile elevations, to lie within the range between 50 and 750 microns, may also be specified.

In modification of the manner of production above described, it is possible alternatively to fabricate the clutch discs directly by punching them out of the cold rolled steel sheet or plate with merchant surface that is to be used as stock. By an at least two-step belt grinding operation, the specified surface texture may be subsequently created on both surfaces of the clutch discs. In at least one first, coarse step, the basic surface texture may be produced, the belt grinding tool being chosen in an effort to attain rugosities $R_z$ in the range from 5 to 25 microns with an arithmetic mean rugosity $R_a$ in the range from 0.5 to 2.5 microns. In at least one subsequent, fine grinding step, the surface is then smoothed somewhat, so that an arithmetic mean rugosity $R_a$ of about 0.2 to 2.0 microns and a residual profile depth $P_t$ of about 2.0 to 15 microns are obtained. The advantage of this method consists in that not only conventional cold rolled sheet, say of DIN 1623 Grade St 13 03 or DIN 1624 Grade St 3K 40 LG, may be used, but also for example cold rolled steel strips suitable for springs, say of DIN 17 222 Grade C 55 or C 60 H+A, may be used, which, owing to their rather high strength, would not permit the basic texture to be rolled in by the method previously described.

Following this completed finishing of the clutch discs, a corrosion protection should be provided in the form of a nickel-phosphorus coating, which is applied in a known manner without external current and subjected to an ensuing heat treatment by tempering. In so doing, the thickness of the coating is so controlled that the surface texture of the clutch discs as described above is not substantially altered, which result is attributable in major part to the currentless coating technique itself.

As the final result of the process of production described, clutch discs are obtained with a microstructure such that, when used in a fluid friction clutch, where they are arranged alternately, very closely spaced, in a housing filled with a high viscosity liquid, they exhibit a favorable torque transmission behavior that remains constant over long periods of service.

While the nickel-phosphorus coating, as has been hinted above, does provide some wear protection for the lamellar clutch discs, the finishing of the punched clutch discs as described ensures a surface texture in which the numerous peaks present in the rough condition have been taken down and smoothed, so that the viscous medium present between the discs, which is intended to transmit the torque, can be accommodated in the valleys of the profile. The essential advantage of this controlled smoothing of the profile, so to speak anticipating the smoothing that would result from wear in operation of the clutch, consists in that this surface texture cannot be substantially altered any further by the wear afterwards occurring in operation of the fluid friction clutch, and any resulting variations in torque transmission behavior are effectively ruled out. Hence the characteristic of the fluid friction clutch ceases to vary over service time, so that from the first it can be accurately adjusted in a well-defined manner by suitable control of the fill of the housing with the viscous medium, consisting preferably of silicone oil (polysiloxane), in accordance with service requirements.

While the invention has been illustrated and described as embodied in Clutch Discs for a Fluid Friction Clutch and Process for Making Same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. Lamellar clutch discs comprised of sheet steel and provided with surfaces having a roughness with an arithmetic mean rugosity $R_a$ in the range between 0.2 and 2.0, microns and a profile depth $P_t$ in the range between 2.0 and 15 microns.

2. Clutch discs as defined in claim 1, wherein neighboring elevations of the rugosity profile lie in the range between 50 and 750 microns.

3. Clutch discs as defined in claim 1 or 2, wherein the disc surfaces are provided with a wear-reducing nickel-phosphorus coating.

* * * * *